United States Patent [19]

Carlin

[11] Patent Number: 5,126,652
[45] Date of Patent: Jun. 30, 1992

[54] UNIVERSAL INPUT VOLTAGE POWER SUPPLY

[75] Inventor: Charles K. Carlin, Raleigh, N.C.

[73] Assignee: Square D Company, Ill.

[21] Appl. No.: 685,353

[22] Filed: Apr. 15, 1991

[51] Int. Cl.[5] .................. H02M 7/217; G05F 1/445
[52] U.S. Cl. .................................. 323/267; 323/282; 323/908; 363/89
[58] Field of Search ............... 363/89, 126; 323/266, 323/267, 282–287, 908, 901

[56] References Cited

U.S. PATENT DOCUMENTS

| | | | |
|---|---|---|---|
| 3,671,853 | 6/1972 | Weischedel et al. | 323/267 |
| 4,494,064 | 1/1985 | Harkness | 323/282 |
| 4,683,415 | 7/1987 | Zimmerman | 323/282 |
| 4,893,228 | 1/1990 | Orrick et al. | 363/89 |
| 4,937,722 | 6/1990 | Deierlein | 363/89 |

Primary Examiner—Peter S. Wong
Attorney, Agent, or Firm—Michael J. Femal

[57] ABSTRACT

The power supply of the present invention is designed to operate over a wide range of both ac and DC input voltages and frequencies from 0–400 Hz. The power supply also provides two DC low voltage outputs, one for devices that do not require a high degree of regulation and one for devices that do require a high degree of regulation. The power supply also includes a power-up inrush clamp to limit high start up currents to approximately two times the nominal switching current. The primary switching transistor of the power supply is controlled by a dynamic feedback circuit which works interactively to increases the switching speed of the primary switching transistor.

11 Claims, 2 Drawing Sheets

UNIVERSAL INPUT VOLTAGE POWER SUPPLY

FIELD OF THE INVENTION

The present invention relates to the field of low voltage DC power supplies. Specifically, the present invention relates to regulated low voltage DC power supplies having a wide range of AC or DC input voltages and a wide range of frequencies.

BACKGROUND OF THE INVENTION

It is well known that solid state and digital electronic devices require regulated low voltage DC power supplies to ensure proper operation without damage to the circuit components. It is also known in the art to manufacture power supplies that will produce a low voltage DC output while having a wide input range of AC or DC volts.

SUMMARY OF THE INVENTION

A goal of the present invention is to provide a highly efficient regulated low voltage DC power supply that can be used with input voltages ranging from 12 to 240 volts and having frequencies from DC to 400 Hertz AC. Efficiency of the power supply is increased by using a high voltage N-channel MOSFET transistor to control the high voltage primary switching transistor.

A second goal of the present invention is to increase the switching slew rate of the power supply by improving the feedback circuitry of the primary switching transistor. The increase in switching slew rate is achieved by inserting a voltage ripple derived from the load current into a dynamic feedback circuit. The injected voltage ripple and a voltage divider network interactively work with the transistor of the dynamic feedback circuit to increases the turn on and turn off speed of the feedback circuit transistors which ultimately control the primary switching transistor.

A third goal of the present invention is to protect the primary switching transistor by providing a power-up inrush clamping feature in the power supply circuit. This is accomplished by placing a by pass diode in the dynamic feedback circuit which limits the switching current to approximately two times the nominal switching current.

Other features and advantages of the invention will become apparent to those skilled in the art upon review of the following detailed description, claims and drawing.

Figure 1:
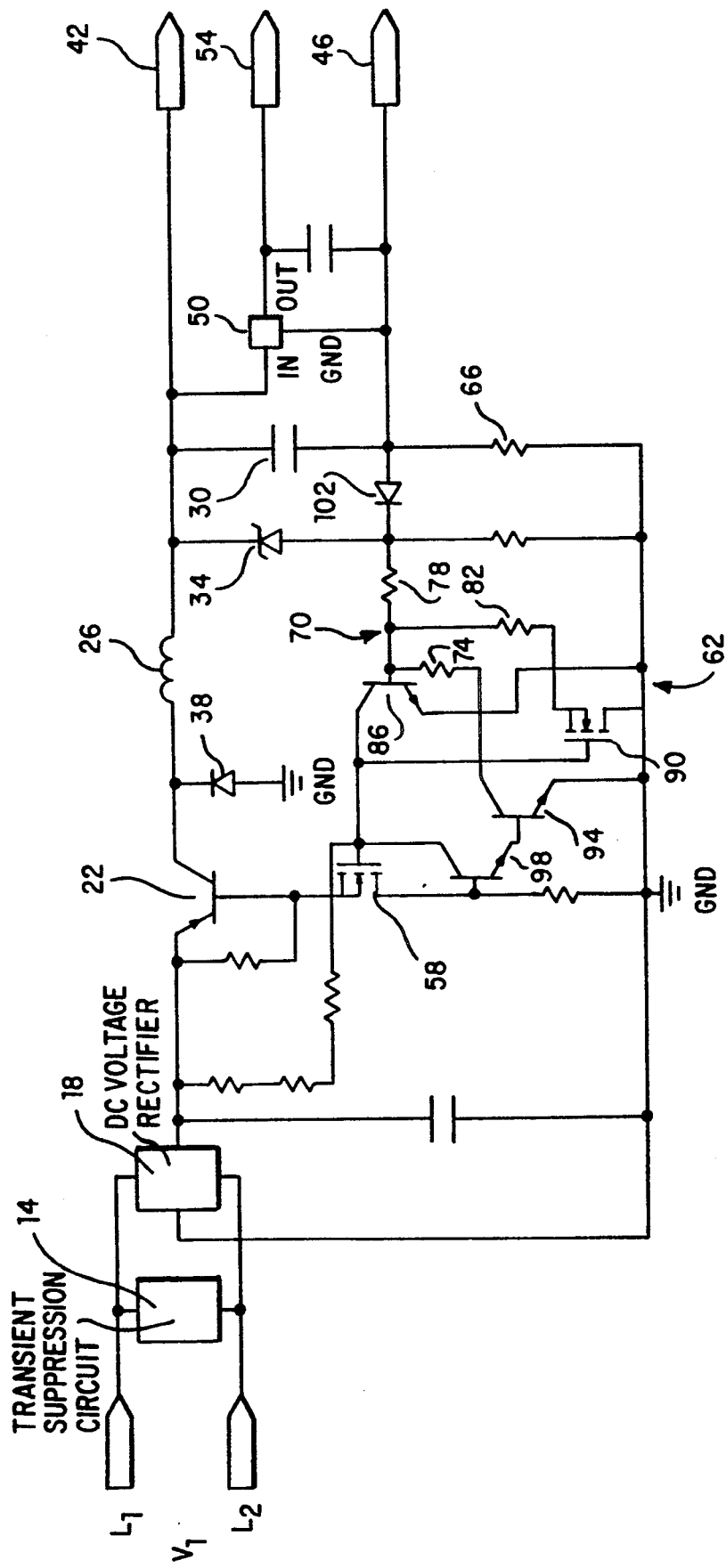
FIG. 1 is a schematic of the universal input voltage power supply circuit.

Before one embodiment of the invention is explained in detail, is to be understood that the invention is not limited in its application to the details of construction and description or illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

Figure 2:
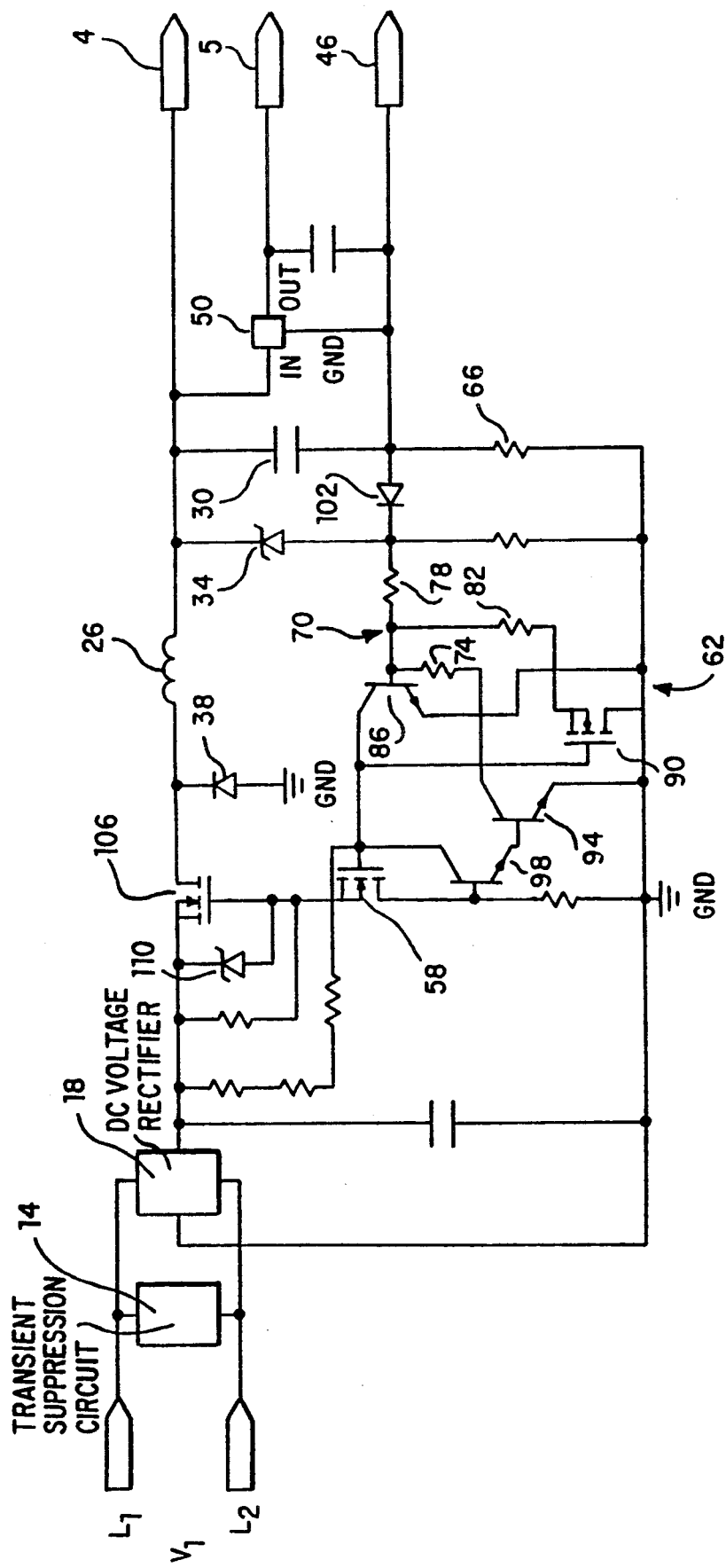
FIG. 2 is a schematic of a second embodiment of the universal input voltage power supply circuit.

A regulated power supply of the present invention is capable of accepting input voltage ranging from 12-240 Vdc or 24-240 Vac and providing two regulated low voltage DC outputs. A first embodiment is shown in FIG. 1 and a second embodiment is shown in FIG. 2. A source $V_1$ of input voltage is applied across terminals $L_1$ and $L_2$. A transient suppression circuit 14 is placed across the line inputs $L_1$ and $L_2$ to suppress any conducted transient voltage spikes from the input voltage. Immediately following the transient voltage suppression circuit, a DC voltage rectifier 18 produces DC voltage for the remainder of the power supply circuit. The primary switching element of the power supply is a first high voltage transistor 22. In the first embodiment a 600 volt PNP bipolar transistor is used for the first high voltage transistor 22. When the first high voltage transistor 22 is turned on a current flows through an 8.5 mH inductor 26 and a low ESR 330 $\mu F$ electrolytic storage capacitor 30 is charged. The inductor 26 drops all of the applied line voltage across its reactive impedance, except for approximately 8.2 volts which is the charge applied to the storage capacitor 30. The charge on the storage capacitor 30 is controlled by an 8.2 volt Zener diode 34 in parallel with the storage capacitor 30. As current flows through the inductor 26, it is stored as magnetic field energy. When the first high voltage transistor 22 is turned off, the field energy of inductor 26 converts to electric current and is supplied to the connected load and the storage capacitor 30 through a freewheeling diode 38. The 8.2 volt charge across the storage capacitor 30 forms a roughly regulated DC output available across output terminal 42 and ground terminal 46. This roughly regulated DC output is suitable for devices which do not required a high degree of regulation or low ripple voltage. A 5 VDc output having a higher degree of regulation and low ripple is provided by a low drop-out voltage regulator 50, such as Motorola LM2931Z-5.0, and is available across terminal 54 and ground terminal 46. This 5 Vdc output is suitable for digital electronic devices.

The on and off switching of first high voltage transistor 22 is controlled by a second high voltage transistor 58. The second high voltage transistor 58 is a 550 volt N-channel MOSFET transistor which can be driven much more efficiently than a bipolar transistor used in the same application. The first high voltage transistor 22 is turned on and off in response to the current flowing from inductor 26 with respect to the rms current of the load device. For this particular embodiment, the first high voltage transistor 22 is turned on when the current of inductor 26 is approximately 30 mA below the rms load current, and turned off when the current of inductor 26 is approximately 30 mA above the rms load current. A dynamic feedback circuit 62 senses the load current and controls the switching of the second high voltage transistor 58 which in turn controls the switching of the first high voltage transistor 22. The dynamic feedback circuit 62 includes a 6.8$\Omega$ current sensing resistor 66 and a divider network 70 comprised of a 1K$\Omega$ resistor 74, a 120$\Omega$ resistor 78, and a 1K$\Omega$ resistor 82. The values of these resistors ultimately control the switching action of the first high voltage transistor 22. The dynamic feedback circuit 62 also includes a first low voltage transistor 86, a second low voltage transistor 90, a third low voltage transistor 94, and a fourth low voltage transistor 98. The first, third, and fourth low voltage transistors 86, 94, and 98 respectively are bipolar transistors. The second low voltage transistor 90 is an N-channel MOSFET transistor and must have a maximum gate voltage threshold less that the minimum gate voltage threshold of second high voltage transistor 58. The current sensing resistor 66 senses and transforms current supplied to the load or the storage capacitor 30 by the first high voltage transistor 22 into a voltage ripple which is injected into the feedback circuit 62. This voltage ripple increases the switching slew rate of the first low voltage transistor 86. Transistor 90, 94, and 98 work together interactively during the switching phase to ultimately increase the switching speed of first high voltage transistor 22.

A bypass diode 102 provides a means for limiting power-up inrush current to the first high voltage transistor 22. The bypass diode 102 permits the inrush current to go directly to the dynamic feedback circuit 62 from the current sensing resitor 66 bypassing the Zener diode 34. Bypass diode 102 is rated at 100 volts and limits the inrush current to approximately two times the nominal switching current or 225 mA.

In the second embodiment shown in FIG. 2, the bipolar first high voltage transistor 22 is replaced with a P-channel MOSFET high voltage transistor 106 and a Zener diode 110 is placed across the gate and source of the MOSFET high voltage transistor 106. The MOSFET transistor 106 increases the switching speed of the power supply from approximately 400 nS with the bipolar transitor to approximately 250 nS with the MOSFET transistor.

The following is a description of the power supply operation starting at the point at which the first high voltage transistor 22 has just turned off. The inductor 26 will start supplying current to the load and storage capacitor 30. When the current supplied by inductor 26 drops to 30 mA rms below the load current the base voltage of the first low voltage transistor 86 will drop below 0.6 volts causing it to start turning off. As first low voltage transistor 86 turns off the gate voltage of second low voltage transistor 90 increases causing it to start turning on. As second low voltage transistor 90 turns on the voltage dividing resistors 78 and 82 reduce the base voltage of transistor 86 causing it to turn off sharply. As first low voltage transistor 86 turns off its collector voltage increases causing the gate voltage of second high voltage transistor 58 to increase turning it on and also turning on first high voltage transistor 22. At this point second high voltage transistor 58 provides constant base current control for first high voltage transistor 22 and fourth low voltage transistor 98 acts as a shunt for the gate of second high voltage transistor 58 creating the constant base drive for first high voltage transistor 22. Third low voltage transistor 94 turns on adding an additional voltage dividing resistor 74 to the divider network 70 and further reducing the base voltage of first low voltage transistor 86. As the ripple voltage produced by sensing resistor 66 increases, the base voltage of first low voltage transistor 86 also increases to a point that it will be sufficient to turn on first low voltage transistor 86. As first low voltage transistor 86 turns on, the gate voltage of second high voltage transistor 58 decreases which also causes third and fourth low voltage transistors 94 and 98 respectively to turn off immediately. When third low voltage transitor 94 turns off dividing resistor 74 is removed from the voltage dividing network 70 causing the base voltage of first low voltage transistor 86 to increase suddenly. The sudden increase in base current causes first low voltage transitor to turn on sharply. As first low voltage transistor 86 turns off the gate voltage of second high voltage transistor is reduced sharply causing it to turn off and also causing first high voltage transitor 22 to turn off.

The combination of feedback transistors 86, 90, and 94 with the voltage divider network 70 provides hysteresis in the dynamic feedback circuit 62. Hysteresis in the dynamic feedback circuit 62 increases the voltage required for turning off the power supply to a level higher that the voltage required to turn on the power supply. This hysteresis or increase in turn off voltage increases switching noise immunity in the power supply.

I claim:

1. An universal input voltage DC power supply connected to an AC or Dc source voltage, said power supply comprising:

a pair of input terminals for receiving the universal AC or DC voltage input;

a transient voltage suppression means connected across said input terminals for suppressing transient voltage spikes from the universal input source voltage;

a DC voltage rectifier means coupled to said transient voltage suppression means for providing a DC voltage to said power supply a first high voltage transistor coupled to said DC voltage rectifier means for primary switching of the power supply;

a second high voltage transistor coupled to the base of said first high voltage transistor for controlling said first high voltage transistor;

a current storage means coupled to the collector of said firs high voltage transistor for supplying current to the load when said first high voltage transistor is turned off;

an inrush clamping means coupled to said current storage means for preventing high start-up currents from damaging said first high voltage transistor;

a dynamic feedback circuit connected between said inrush clamping means and the base of said second high voltage transistor for interactively speeding up the switching rate of said first high voltage transistor;

a first low voltage output connected to the current storage means for devices not requiring a high degree of regulation or low ripple voltage; and a second low voltage output connected to the current storage means for devices requiring a higher degree of regulation and low ripple voltage.

2. The power supply of claim 1 wherein said current storage means comprises:

an inductor for storing current as magnetic field energy; and a storage capacitor charged to a value determine by a Zener diode in parallel with said stroage capacitor.

3. The power supply of claim 2 wherein said inrush clamping means comprises:

a bypass diode for permitting the inrush current to bypass said storage capacitor and said Zener diode and flow directly to said dynamic feedback circuit for controlling the switching of said first high voltage transistor.

4. The power supply of claim 3 wherein said first high voltage transistor is a high voltage PNP bipolar transistor.

5. The power supply of claim 4 wherein said second high voltage transistor is a high voltage N-channel MOSFET transistor 6. The power supply of claim 5 wherein said dynamic feedback circuit comprises:
- a sensing resistor for sensing load current and converting the load current into a ripple voltage inserted into said dynamic feedback circuit;
- a plurality of low voltage transistors connected such that the output of one of said transistors influences the state of another of said transitors;
- a reistor divider network activated by said low voltage transistor, said resitor divider network interacts with said low voltage transitors to increase the switching speed of said high voltage transistors.

7. The power supply of claim 6 wherein one of said low voltage transistors is a low voltage N-channel MOSFET transistor and wherein the maximum gate voltage threshold of said low voltage N-channel MOSFET transistor is less than the minimum gate voltage threshold of said high voltage P-channel MOSFET transistor.

8. The power supply of claim 6 wherein said ripple current initiates the power supply switching process.

9. The power supply of claim 1 wherein said first low voltage output is taken across said storage capacitor.

10. The power supply of claim 1 wherein said second low voltage ouput is taken across a low drop-out voltage regulator.

11. The power supply of claim 1 wherein said first high voltage transistor is a high voltage N-channel MOSFET transistor.

* * * * *